J. EDWARDS.
Apparatus for Purifying and Cooling Air.
No. 226,908.  Patented April 27, 1880.
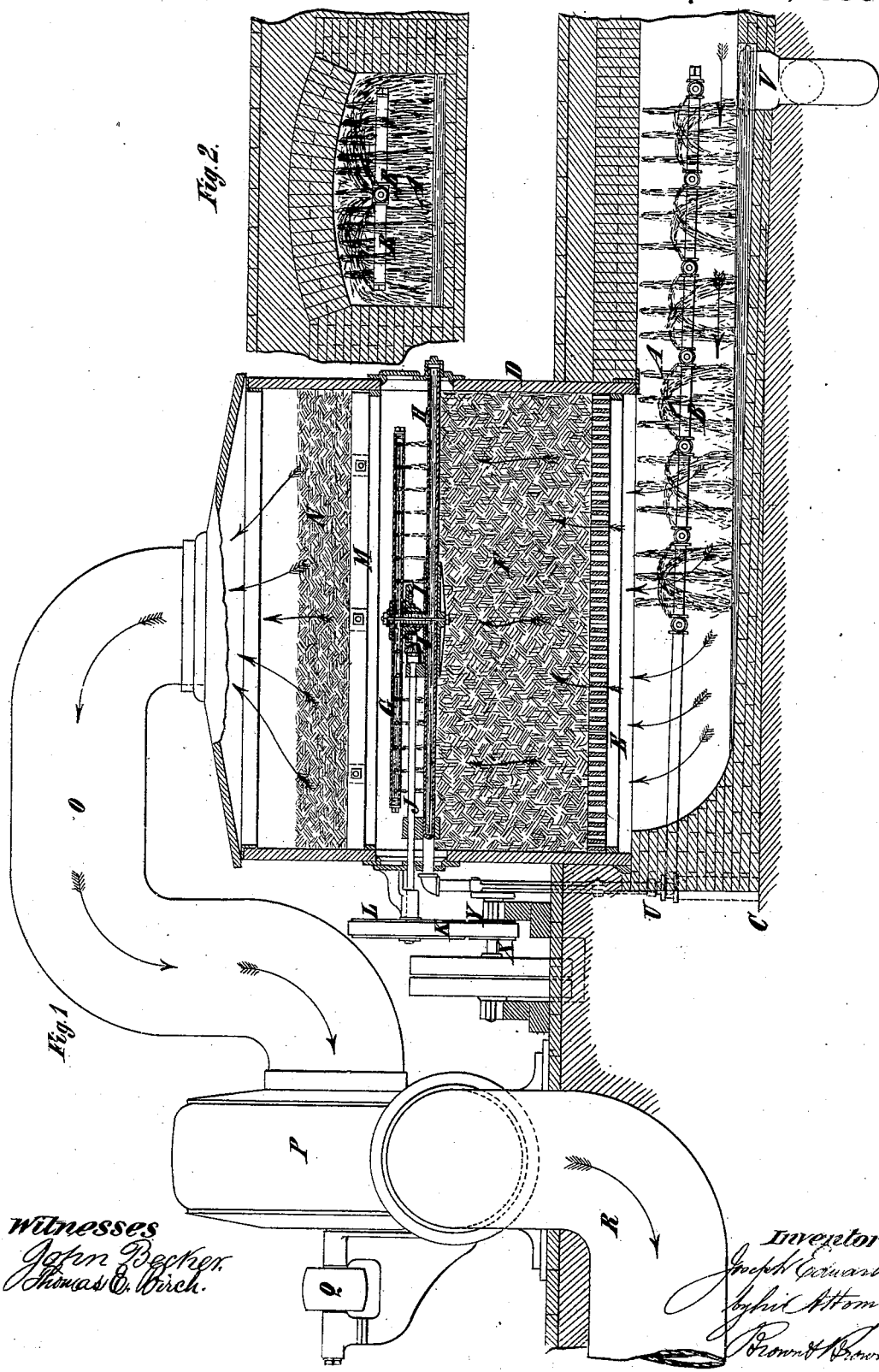

UNITED STATES PATENT OFFICE.

JOSEPH EDWARDS, OF NEW YORK, N. Y.

APPARATUS FOR PURIFYING AND COOLING AIR.

SPECIFICATION forming part of Letters Patent No. 226,908, dated April 27, 1880.

Application filed December 10, 1879.

*To all whom it may concern:*

Be it known that I, JOSEPH EDWARDS, of the city, county, and State of New York, have invented certain new and useful Improvements in Apparatus for Purifying and Regulating the Temperature of Air, of which the following is a specification.

Heretofore various apparatus for purifying and regulating the temperature of air have been employed, and one apparatus, comprising a filter of charcoal, means for distributing water upon the charcoal so as to percolate through it, and devices for causing air to ascend through the charcoal and descending water, has been used with good results. The latter has, however, been defective in that as the air in winter-time enters the filter at so low a temperature that it causes the water in the filter to freeze up and choke the interstices in and between the charcoal, rendering the filter useless, or at least materially impairing its utility.

The use of a heating apparatus to raise the temperature of the air before its entrance into the filter is expensive and otherwise objectionable.

The principal object of my invention is to provide a means whereby the temperature of the air may be modified, and the air also partially purified and moistened by water, before entering the filter.

My invention therefore consists in the combination, in an apparatus for purifying and regulating the temperature of air, with a filter, and preferably means for distributing water upon the same, of devices separate from and independent of the filter, arranged in a conduit leading to the filter, whereby the air before entering the filter is subjected to the action of water, so that its temperature is modified and it is partially purified and is moistened before it reaches the filter.

It also consists in various combinations and parts hereinafter described and claimed.

In the accompanying drawings, Figure 1 represents a central vertical section of an apparatus embodying my invention, with the exception of certain pipes and appurtenances which, possessing nothing novel, I have not thought worthy of being shown in section; and Fig. 2 is a transverse section of the air-ingress conduit thereof.

Similar letters of reference designate corresponding parts in both figures.

A designates an air-ingress conduit or passage, which may be built of masonry and arranged in the basement of a building or other convenient place, so as to communicate with the outside of the building. B designates a water-distributing pipe extending through this air-ingress conduit, and supplied with water from an ordinary street-main, from a well or cistern, C, or other source by means of a pump, U, operated by a shaft, X; and this pipe B is perforated, so that fine jets or a spray of water will issue from it, commingling with the air in the ingress-conduit and modifying its temperature.

When the air is of a higher temperature than the water, as in summer it generally will be, the temperature of the air is thus somewhat reduced; but when the air is cooler than the water, as in winter, the temperature of the air is raised above the freezing-point of water; and to effect this latter result is the principal purpose of this feature of the invention. The bottom of this air-ingress conduit is shown as made slanting toward the outer end, where it is provided with an overflow-pipe, V, whence the water passes to a sewer or other suitable waste-escape.

The water accumulated on the bottom aids in modifying the temperature of the air passing over it.

The air-ingress conduit A communicates with a filter arranged above it, and consisting, essentially, of a cylinder, D, fitted at the bottom with a perforated bottom plate, E, and containing large pieces or lumps of charcoal, F. Above the charcoal F is preferably arranged an apparatus for distributing water upon the charcoal, and consisting of a revolving pipe or pipes, G, supplied with water from a pipe, H, and perforated, so that as it revolves it will effectively distribute the water in fine sprays over the entire surface of the charcoal. The pipe H is shown as being revolved by gear-wheels I through a shaft, J, which derives motion through the belt K, passing over a pulley, L, with which it is provided, and over a pulley, Y, on the shaft X.

In the cylinder D, above the water-dispensing apparatus, is preferably arranged a perforated plate or support, M, whereon is arranged a quantity of charcoal, N. An air-pipe, O, leads from the cylinder D to a suction-blower, P, operated by a belt on a pulley, Q, and whence the air is conducted by a pipe, R, to the apartments in the building where it is desired.

Air passing through the ingress-conduit A has its temperature modified by the water distributed therein, is partially purified, and is moistened. Passing through the filter, it is purified more completely, and, if the revolving pipe or pipes G be employed, is also further modified in temperature and moistened. Passing thence through the charcoal N, the air is still further purified, and is, if too highly saturated with water, partially dried before proceeding to the apartments where needed.

The revolving pipe or pipes G and charcoal N may be dispensed with, if desirable, in many cases.

By my invention I provide a very efficient apparatus for purifying and regulating the temperature of air, and one wherein the temperature of the air may, before its entrance into the filter, be so modified as to obviate the freezing of water in the filter even in cold weather.

I am aware that it is common to cool and purify air by passing the same upward through a filter of charcoal which is kept sprinkled with water; also, that it is common to provide the conduit or channel leading to a building to be ventilated with a spraying device; also, that it is common to moisten and cool air by passing it upward through a chamber in which are a series of transverse perforated partitions, through which the water percolates downward as the air passes upward. My invention differs from these in that I combine immediately with the filter a device whereby the air is cooled and partly purified before passing to and through the filter, thereby modifying the temperature of the air, so as to prevent the water freezing while passing through the filter.

What I claim as my invention, and desire to secure by Letters Patent, is—

1. In an apparatus for purifying and regulating the temperature of air, the combination, with a filter, of an air-ingress conduit leading to the filter and provided with a device independent of and separate from the filter, whereby air before entering the filter is subjected to the action of water and its temperature modified, substantially as and for the purpose specified.

2. In an apparatus for purifying and regulating the temperature of air, the combination, with the filter D E F, of the air-ingress conduit A, leading to the filter and provided with the perforated pipe B, substantially as and for the purpose specified.

3. In an apparatus for purifying and regulating the temperature of air, the combination of the filter D E F, the revolving perforated pipe G, the air-ingress conduit A, leading to the filter, and the perforated pipe B, arranged in said conduit, all substantially as and for the purpose specified.

JOSEPH EDWARDS.

Witnesses:
CHANDLER HALL,
E. P. JESSUP.